United States Patent
Hashizume et al.

(10) Patent No.: US 11,643,476 B2
(45) Date of Patent: May 9, 2023

(54) CELLULOSE ESTER AND MOLDED ARTICLE THEREOF

(71) Applicant: Daicel Corporation, Osaka (JP)

(72) Inventors: Tomohiro Hashizume, Himeji (JP); Hiroyuki Matsumura, Himeji (JP); Tohru Shibata, Himeji (JP); Hiroshi Koyama, Himeji (JP); Mitsuru Ohno, Himeji (JP); Tomoichi Watabe, Himeji (JP)

(73) Assignee: DAICEL CORPORATION, Osaka (JP)

( * ) Notice: Subject to any disclaimer, the term of this patent is extended or adjusted under 35 U.S.C. 154(b) by 116 days.

(21) Appl. No.: 17/153,285

(22) Filed: Jan. 20, 2021

(65) Prior Publication Data
US 2021/0139611 A1 May 13, 2021

Related U.S. Application Data

(63) Continuation of application No. 16/091,951, filed as application No. PCT/JP2017/014069 on Apr. 4, 2017, now Pat. No. 10,927,190.

(30) Foreign Application Priority Data

| Apr. 8, 2016 | (JP) | 2016-078342 |
| Mar. 8, 2017 | (JP) | 2017-043677 |
| Mar. 8, 2017 | (JP) | 2017-043678 |
| Mar. 8, 2017 | (JP) | 2017-043679 |

(51) Int. Cl.
| C08B 3/16 | (2006.01) |
| B01D 71/14 | (2006.01) |
| B01D 69/08 | (2006.01) |
| B01D 71/18 | (2006.01) |
| C08J 5/18 | (2006.01) |

(52) U.S. Cl.
CPC ............ *C08B 3/16* (2013.01); *B01D 69/08* (2013.01); *B01D 71/14* (2013.01); *B01D 71/18* (2013.01); *C08J 5/18* (2013.01); *C08J 2301/14* (2013.01)

(58) Field of Classification Search
CPC . C08B 3/16; B01D 69/08; B01D 71/18; C08J 5/18; C08J 2301/14
See application file for complete search history.

(56) References Cited

U.S. PATENT DOCUMENTS

| 4,661,162 A | 4/1987 | Kurihara et al. |
| 6,019,925 A | 2/2000 | Diamantoglou et al. |
| 6,309,666 B1 | 10/2001 | Hatano et al. |
| 2008/0107829 A1 | 5/2008 | Oya et al. |
| 2009/0002605 A1 | 1/2009 | Imai et al. |
| 2010/0305249 A1 | 12/2010 | Buchanan et al. |
| 2012/0264930 A1 | 10/2012 | Buchanan et al. |
| 2013/0128359 A1 | 5/2013 | Wakita et al. |
| 2015/0265976 A1 | 9/2015 | Shimizu et al. |

FOREIGN PATENT DOCUMENTS

| CN | 102459349 A | 5/2012 |
| CN | 105237643 A | 1/2016 |
| EP | 1215216 A1 | 6/2002 |
| JP | 58-174307 A | 10/1983 |
| JP | 59-193831 A | 11/1984 |
| JP | 9-87169 A | 3/1997 |
| JP | 10-52630 A | 2/1998 |
| JP | 2002-155102 A | 5/2002 |
| JP | 2002-179701 A | 6/2002 |
| JP | 2004-155146 A | 6/2004 |
| JP | 2006-45141 A | 2/2006 |
| JP | 2007-297541 A | 11/2007 |

(Continued)

OTHER PUBLICATIONS

Rojas et al., Journal of Advanced Pharmaceutical Technology & Research, 2011, 2(3), p. 144-150. (Year: 2011).*
Oxford English Dictionary, entry for membrane, https://www.oed.com, accessed online on Aug. 9, 2022. (Year: 2022).*
Korean Office Action for Korean Application No. 10-2018-7028434, dated Apr. 28, 2021.
Braun et al., Die Angewandte Makromdekulare Chemie, 1994, vol. 220, pp. 199-207, English summary only.

(Continued)

*Primary Examiner* — Jonathan S Lau
(74) *Attorney, Agent, or Firm* — Birch, Stewart, Kolasch & Birch, LLP

(57) ABSTRACT

A cellulose ester, wherein, in a structural formula of the following general formula (I), a degree of substitution where X is an acyl group is from 2.91 to 3.0; the acyl group includes benzoyl group (A) optionally having a substituent, and benzoyl group (B) optionally having a substituent different from that of benzoyl group (A); and when the degree of substitution is 3.0, a degree of substitution of benzoyl group (A) is from 1.5 to 2.9, and a degree of substitution of benzoyl group (B) is from 0.1 to 1.5,

[Formula 1]

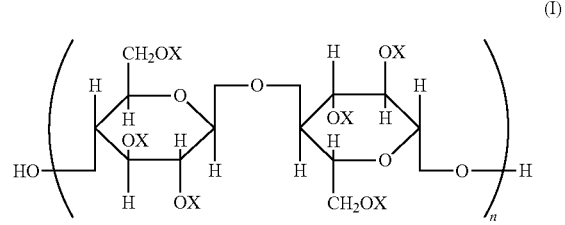

(I)

wherein all or some of X represents an acyl group; when some of X represents an acyl group, the remainder represents a group selected from a hydrogen atom and an alkyl group; and n represents an integer of from 20 to 20,000.

4 Claims, 1 Drawing Sheet

(56) References Cited

FOREIGN PATENT DOCUMENTS

| JP | 2008-95026 | A | 4/2008 |
|---|---|---|---|
| JP | 2009-30031 | A | 2/2009 |
| JP | 2009-91542 | A | 4/2009 |
| JP | 2012-524144 | A | 10/2012 |
| JP | 2013-130860 | A | 7/2013 |
| JP | 5418739 | B1 | 2/2014 |
| JP | 5471242 | B2 | 4/2014 |
| JP | 2014-513178 | A | 5/2014 |
| JP | 2014-240905 | A | 12/2014 |
| SU | 789538 | A1 | 12/1980 |

OTHER PUBLICATIONS

Foreign priority documents Japan 2017-043677, filed Mar. 8, 2017.
Foreign priority documents Japan 2017-043678, filed Mar. 8, 2017.
Foreign priority documents Japan 2017-043679, filed Mar. 8, 2017.
English translation of International Preliminary Report on Patentability and Written Opinion dated Oct. 18, 2018, in PCT/JP2017/014069 (Forms PCT/IB/326, PCT/IB/373, and PCT/ISA/237).
Extended European Search Report dated Nov. 7, 2019, in European Patent Application No. 17779130.8.
Garcés et al., "Mixed cellulose-derived benzoates bonded on allylsilica gel as HPLC chiral stationary phases: influence of the introduction of an aromatic moiety in the fixation substituent", Tetrahedron: Asymmetry, 2003, vol. 14, No. 9, pp. 1179-1185.
International Search Report for PCT/JP2017/014069 (PCT/ISA/210) dated Jun. 20, 2017.
Katoh et al., "Chiral recognition ability of cellulose derivatives bearing pyridyl and bipyridyl residues as chiral stationary phases for high-performance liquid chromatography", Polymer Journal, 2011, vol. 43. No. 1, pp. 84-90.
Klemm et al., Angew. Chem. Int. Ed., 2005, vol. 44, pp. 3358-3393.
Senso et al., "Characterization of doubly substituted polysaccharide derivatives", Carbohydrate Research, 2000, vol. 329, No. 2, pp. 367-376.
Written Opinion of the International Searching Authority for PCT/JP2017/014069 (PCT/ISA/237) dated Jun. 20, 2017.
Wu et al., "Gas Permeability of Novel α-Cellulose Membrane," Journal of Chemical Industry and Engineering (China), vol. 54, vol. 3, Mar. 2003, pp. 333-338, with English abstract.
Zhang et al., "Synthesis of cellulose benzoates under homogeneous conditions in an ionic liquid", Cellulose, 2009, vol. 16, No. 2, pp. 299-308.
European Office Action for European Application No. 17 779 130.8, dated Aug. 9, 2022.
Vyas et al., "Development and Characterization of Cellulose Acetate Benzoate Flat Osmotic Membranes", Journal of Applied Polymer Science, vol. 52, No. 8, May 23, 1994, pp. 1031-1035.

* cited by examiner

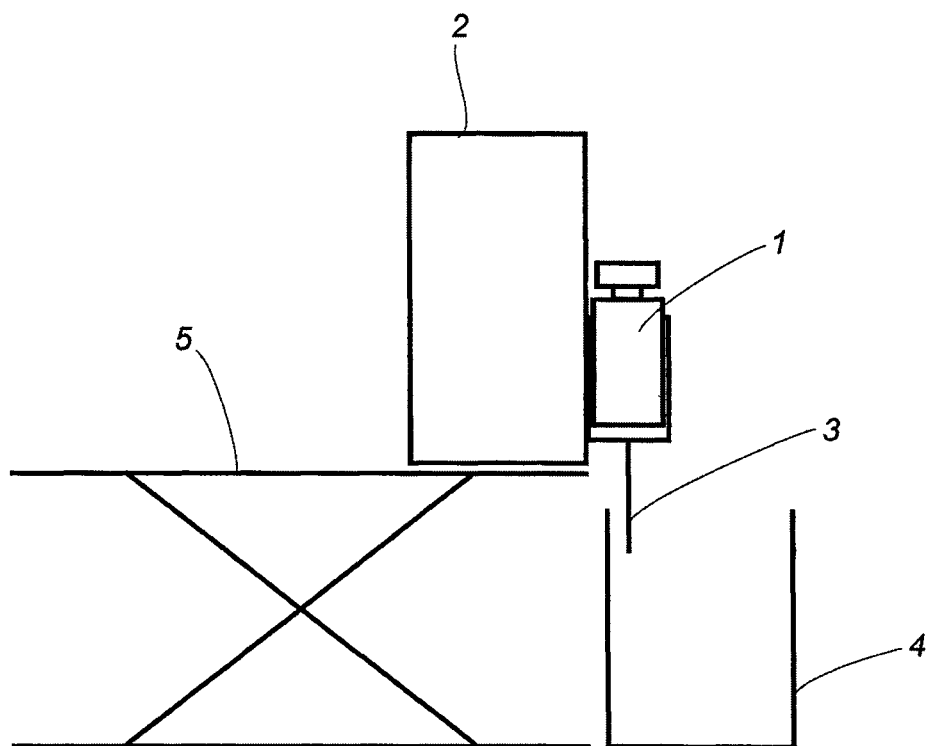

CELLULOSE ESTER AND MOLDED ARTICLE THEREOF

CROSS REFERENCE TO RELATED APPLICATIONS

This application is a Continuation of copending application Ser. No. 16/091,951, filed on Oct. 5, 2018, which was filed as PCT International Application No. PCT/JP2017/014069 on Apr. 4, 2017, which claims the benefit under 35 U.S.C. § 119(a) to Patent Application No. 2016-078342, filed in Japan on Apr. 8, 2016, Patent Application No. 2017-043677, filed in Japan on Mar. 8, 2017, Patent Application No. 2017-043678, filed in Japan on Mar. 8, 2017, and Patent Application No. 2017-043679, filed in Japan on Mar. 8, 2017, all of which are hereby expressly incorporated by reference into the present application.

FIELD OF THE INVENTION

The present invention relates to a cellulose ester which can be used as a semipermeable membrane, a film, and a sheet or the like, and a molded article containing the cellulose ester.

BACKGROUND OF THE INVENTION

A water treatment technique using a membrane containing cellulose acetate as a membrane material has been known (Patent Literatures 1 and 2).

The invention of a water treatment method which uses an RO membrane containing triacetyl cellulose or the like and having chlorine resistance (Paragraph 0031) is described in JP-B 5471242.

The invention of a hollow fiber type semipermeable membrane for forward osmosis treatment containing cellulose acetate is described in JP-B 5418739. The cellulose acetate being resistant to chlorine as a bactericide, and cellulose triacetate being preferred in view of durability are described in Paragraph 0017.

The invention of a method for producing a stable and storable cellulosic dialysis membrane for low, middle, or high flux range in the form of a flat, tubular, or hollow fiber membrane is described in JP-A 10-52630. The use of modified cellulose as a membrane-forming ingredient is described.

The inventions of a regioselectively substituted cellulose ester containing a plurality of alkyl-acyl substituents and a plurality of aryl-acyl substituents, and an optical film are described in JP-A 2014-513178.

SUMMARY OF THE INVENTION

It is an object of the present invention to provide a molded article containing a cellulose ester having at least higher alkali resistance than that of a triacetyl cellulose membrane.

The present invention provides the following inventions (1) to (5).

<(1)>

A cellulose ester represented by a structural formula of the following general formula (I), wherein:

a degree of substitution where X is an acyl group is from 2.91 to 3.0;

the acyl group includes benzoyl group (A) optionally having a substituent, and benzoyl group (B) optionally having a substituent different from that of benzoyl group (A) optionally having a substituent; and when the degree of substitution is 3.0, a degree of substitution of benzoyl group (A) optionally having a substituent is from 1.5 to 2.9, and a degree of substitution of benzoyl group (B) optionally having a substituent is from 0.1 to 1.5,

[Formula 1]

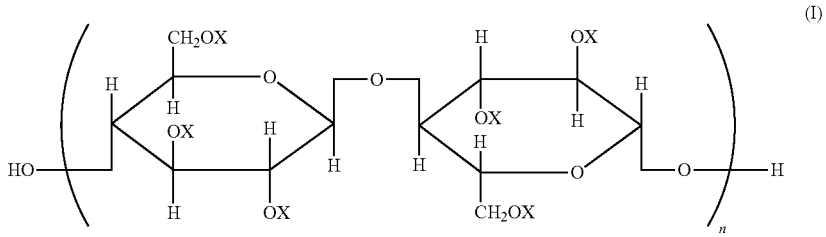

wherein all or some of X represents an acyl group; when some of X represents an acyl group, the remainder represents a group selected from a hydrogen atom and an alkyl group; and n represents an integer of from 20 to 20,000.

<(2)>

A molded article containing a cellulose ester represented by a structural formula of the following general formula (I), wherein:

a degree of substitution where X is an acyl group is from 2.91 to 3.0;

the acyl group includes benzoyl group (A) optionally having a substituent, and substituent (C) different from the benzoyl group (A) optionally having a substituent (excluding a benzoyl group optionally having a substituent);

when the degree of substitution is 3.0, a degree of substitution of benzoyl group (A) optionally having a substituent is from 1.1 to 2.9, and a degree of substitution of substituent (C) is from 0.1 to 1.9; and substituent (C) is selected from an aliphatic acyl group having 3 or more carbon atoms and an aromatic acyl group having 5 or more carbon atoms,

[Formula 1]

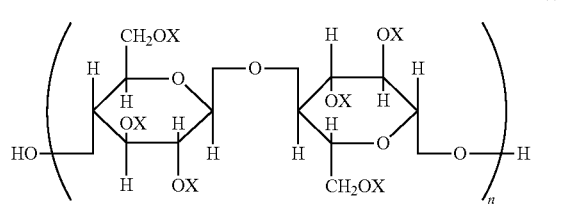

wherein all or some of X represents an acyl group; when some of X represents an acyl group, the remainder represents a group selected from a hydrogen atom and an alkyl group; and n represents an integer of from 20 to 20,000.

<(3)>

A cellulose ester represented by a structural formula of the following general formula (I), wherein:

a degree of substitution where X is an acyl group is from 2.91 to 3.0;

the acyl group includes benzoyl group (A) optionally having a substituent, and acyl group (B) containing a carboxyl group or a salt of a carboxyl group; and when the degree of substitution is 3.0, a degree of substitution of benzoyl group (A) optionally having a substituent is from 2.4 to 2.95, and a degree of substitution of acyl group (B) containing a carboxyl group or a salt of a carboxyl group is from 0.05 to 0.6,

[Formula 1]

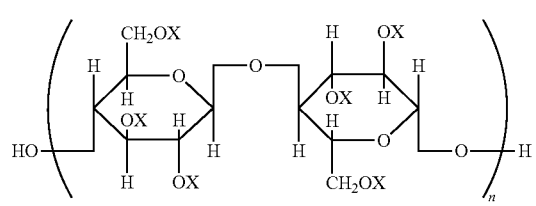

wherein all or some of X represents an acyl group; when some of X represents an acyl group, the remainder represents a group selected from a hydrogen atom and an alkyl group; and n represents an integer of from 20 to 20,000.

<(4)>

A cellulose ester represented by a structural formula of the following general formula (II), wherein:

a degree of substitution where X is an acyl group is from 2.2 to 2.9;

the acyl group includes benzoyl group (A) optionally having a substituent, and acyl group (B) containing a carboxyl group or a salt of a carboxyl group;

a degree of substitution of benzoyl group (A) optionally having a substituent is from 2.15 to 2.85, and a degree of substitution of acyl group (B) containing a carboxyl group or a salt of a carboxyl group is from 0.05 to 0.6; and a degree of substitution equivalent to a hydroxyl group where X is a hydrogen atom is from 0.1 to 0.8,

[Formula 2]

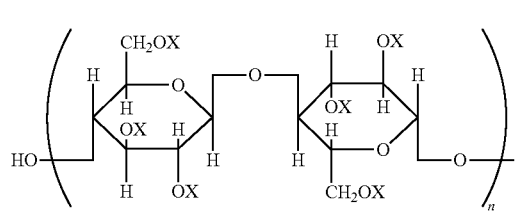

wherein some of X represents an acyl group; the remainder represents a hydrogen atom; and n represents an integer of from 20 to 20,000.

<(5)>

A molded article containing a cellulose ester represented by a structural formula of the following general formula (II), wherein:

a degree of substitution where X is an acyl group is from 1.5 to 2.9;

80 mol % or more of the acyl group is a benzoyl group optionally having a substituent; and a degree of substitution of a hydroxyl group where X is a hydrogen atom is from 0.1 to 1.5,

[Formula 2]

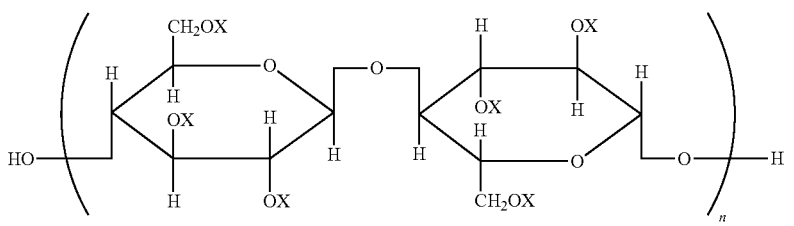

wherein some of X represents an acyl group; the remainder represents a hydrogen atom; and n represents an integer of from 20 to 20,000.

A molded article containing a cellulose ester of the present invention has at least higher alkali resistance than that of a triacetyl cellulose membrane.

BRIEF DESCRIPTION OF DRAWINGS

FIG. 1 is an illustration of a method for manufacturing a porous filament in Examples.

EMBODIMENTS OF THE INVENTION

<(1) First Cellulose Ester and Molded Article>

A first cellulose ester is represented by a structural formula of the following general formula (I),

[Formula 1]

wherein all or some of X represents an acyl group; when some of X represents an acyl group, the remainder represents a group selected from a hydrogen atom and an alkyl group; and n represents an integer of from 20 to 20,000.

In the first cellulose ester, the degree of substitution where X is an acyl group is from 2.91 to 3.0. The "degree of substitution" is the average value of the numbers of acyl groups to be added with respect to three hydroxy groups in a glucose ring.

When the degree of substitution of the acyl group is 3.0, all of X is an acyl group.

When the degree of substitution of the acyl group is less than 3.0, the remainder of X is a group selected from a hydrogen atom and an alkyl group.

n represents an integer of from 20 to 20,000, preferably an integer of from 40 to 10,000, and more preferably an integer of from 60 to 8,000.

When X is an acyl group, the acyl group includes benzoyl group (A) optionally having a substituent, and benzoyl group (B) optionally having a substituent different from that of benzoyl group (A) optionally having a substituent.

The degree of substitution of benzoyl group (A) optionally having a substituent is from 1.5 to 2.9.

The degree of substitution of benzoyl group (B) optionally having a substituent is from 0.1 to 1.5.

Each of benzoyl groups (A) and (B) optionally having a substituent is a benzoyl group, or a benzoyl group having one or more substituents such as an alkyl group (such as a methyl group, a trifluoromethyl group, a tert-butyl group, or a phenyl group), an alkoxy group (such as a methoxy group or a phenoxy group), a hydroxy group, an amino group, an imino group, a halogeno group, a cyano group, and a nitro group at one or more of an ortho-position, a meta-position, and a para-position.

Among these, benzoyl groups (A) and (B) optionally having a substituent are preferably selected from a benzoyl group, a p-methylbenzoyl group, an o-methylbenzoyl group, a p-methoxybenzoyl group, an o-methoxybenzoyl group, and a dimethylbenzoyl group which have both high chlorine resistance and high alkali resistance and are easily obtained.

The first cellulose ester can be used for a molded article having a shape and a size depending on the intended use.

The molded article containing the first cellulose ester is preferably selected from a semipermeable membrane, a sheet, an expanded sheet, a tray, a pipe, a film, a fiber (filament), a nonwoven fabric, and a container including a bag.

The semipermeable membrane can be manufactured by using the first cellulose ester, a solvent, and a membrane-forming solution which contains salts and a non-solvent as necessary.

Examples of the solvent include N,N-dimethylformamide, N,N-dimethylacetamide, N,N-dimethyl sulfoxide (DMSO), and N-methyl-2-pyrolidone (NMP), and N,N-dimethyl sulfoxide (DMSO) is preferred.

Examples of the non-solvent include ethylene glycol, diethylene glycol, triethylene glycol, and polyethylene glycol.

Examples of the salts include lithium chloride, sodium chloride, potassium chloride, magnesia chloride, and calcium chloride, and lithium chloride is preferred.

It is preferable that the concentration of the first cellulose ester is from 10 to 35% by mass, and the concentration of the solvent is from 65 to 90% by mass.

The concentration of the salts is preferably from 0.5 to 2.0% by mass based on the total mass (100 parts by mass) of the first cellulose ester and the solvent.

The semipermeable membrane can be manufactured by utilizing a known manufacturing method, for example, a manufacturing method described in Examples of JP-B 5418739 using the membrane-forming solution.

The semipermeable membrane is preferably a hollow fiber membrane, a separation functional membrane such as a reverse osmosis membrane or a forward osmosis membrane, or a flat membrane.

The film can be manufactured by applying a method of casting the membrane-forming solution on a substrate and thereafter drying the membrane-forming solution.

The fiber (filament) can be manufactured by applying a known wet type spinning method or dry type spinning method using the membrane-forming solution.

The nonwoven fabric can be manufactured by a method of laminating fibers using an adhesive, and a method of laminating fibers according to thermal fusion bonding.

The tray, the expanded sheet, and the container including a bag can be manufactured by mixing the first cellulose ester and a known additive for resin (plasticizer or the like) as necessary, and thereafter applying a known molding method such as extrusion molding, blow molding, or injection molding.

<(2) Molded Article Containing Second Cellulose Ester>

A second cellulose ester is shown by a structural formula of the following general formula (I),

[Formula 1]

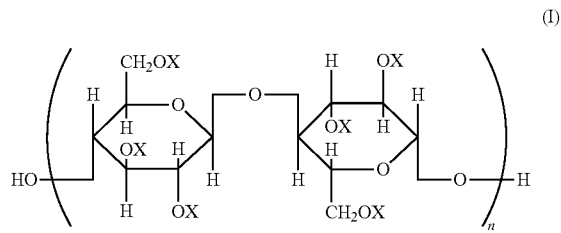

(I)

wherein all or some of X represents an acyl group; when some of X represents an acyl group, the remainder represents a group selected from a hydrogen atom and an alkyl group; and n represents an integer of from 20 to 20,000.

In the second cellulose ester, the degree of substitution where X is an acyl group is from 2.91 to 3.0. The "degree of substitution" is the average value of the numbers of acyl groups to be added with respect to three hydroxy groups in a glucose ring.

When the degree of substitution of the acyl group is 3.0, all of X is the acyl group.

When the degree of substitution of the acyl group is less than 3.0, the remainder of X is a group selected from a hydrogen atom and an alkyl group.

n represents an integer of from 20 to 20,000, preferably an integer of from 40 to 10,000, and more preferably an integer of from 60 to 8,000.

When X in the general formula (I) is an acyl group, the acyl group includes benzoyl group (A) optionally having a substituent, and substituent (C) different from the benzoyl group (A) optionally having a substituent (excluding a benzoyl group optionally having a substituent).

Benzoyl group (A) optionally having a substituent is preferably selected from a benzoyl group, a p-methylbenzoyl group, an o-methylbenzoyl group, a p-methoxybenzoyl group, an o-methoxybenzoyl group, and a dimethylbenzoyl group.

Substituent (C) different from benzoyl group (A) optionally having a substituent (excluding a benzoyl group optionally having a substituent) is an aliphatic acyl group having 3 or more carbon atoms, or an aromatic acyl group having 5 or more carbon atoms.

The aliphatic acyl group having 3 or more carbon atoms is preferably selected from a propanoyl group, a butanoyl group, a pivaloyl group, a pentanoyl group, a hexanoyl group, a decanoyl group, and an octadecanoyl group.

The aromatic acyl group having 5 or more carbon atoms of substituent (C) is preferably selected from an acyl group having a pyrrole ring, an acyl group having a pyridine ring (a picolynyl group and a nicotinyl group), and an acyl group having a naphthalene ring.

The degree of substitution of benzoyl group (A) optionally having a substituent is from 1.1 to 2.9, and preferably from 2.1 to 2.9.

The degree of substitution of substituent (C) is from 0.1 to 1.9, and preferably from 0.1 to 0.9.

A molded article containing the second cellulose ester can have a shape and a size depending on the intended use.

The molded article containing the second cellulose ester is preferably selected from a semipermeable membrane, a sheet, an expanded sheet, a tray, a pipe, a film, a fiber (filament), a nonwoven fabric, and a container including a bag.

The semipermeable membrane can be manufactured in the same manner as in the method for manufacturing a semipermeable membrane using the first cellulose ester by using the second cellulose ester, a solvent, and a membrane-forming solution which contains salts and a non-solvent as necessary.

The semipermeable membrane of the present invention is preferably a hollow fiber membrane, a separation functional membrane such as a reverse osmosis membrane or a forward osmosis membrane, or a flat membrane.

The film, the fiber (filament), the nonwoven fabric, the tray, the expanded sheet, and the container including a bag can be manufactured in the same manner as in the method for manufacturing a film, a fiber (filament), a nonwoven fabric, a tray, an expanded sheet, and a container including a bag using the first cellulose ester by using the second cellulose ester, a solvent, and a membrane-forming solution which contains salts and a non-solvent as necessary.

<(3) Third Cellulose Ester>

A third cellulose ester of the present invention is represented by a structural formula of the following general formula (I),

[Formula 1]

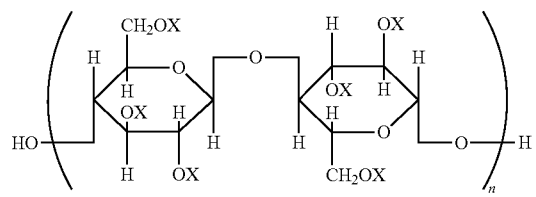

(I)

wherein all or some of X represents an acyl group; when some of X represents an acyl group, the remainder represents a hydrogen atom or an alkyl group; and n represents an integer of from 20 to 20,000.

When X in the third cellulose ester is an acyl group, the degree of substitution of the acyl group is from 2.91 to 3.0. The "degree of substitution" is the average value of the numbers of acyl groups to be added with respect to three hydroxy groups in a glucose ring.

When the degree of substitution of the acyl group is 3.0, all of X are the acyl groups.

When the degree of substitution of the acyl group is less than 3.0, the other X groups are a hydrogen atom or an alkyl group.

n represents an integer of from 20 to 20,000, preferably an integer of from 40 to 10,000, and more preferably an integer of from 60 to 8,000.

When X is an acyl group, and the degree of substitution of the acyl group is 3.0, the acyl group includes benzoyl group (A) optionally having a substituent, and acyl group (B) containing a carboxyl group or a salt of a carboxyl group.

The degree of substitution of benzoyl group (A) optionally having a substituent is from 2.4 to 2.95, which is indispensable in order to improve the chlorine resistance and alkali resistance of the cellulose ester of the present invention.

The degree of substitution of acyl group (B) containing a carboxyl group or a salt of a carboxyl group is from 0.05 to 0.6, and preferably from 0.1 to 0.5.

When the degree of substitution of acyl group (B) containing a carboxyl group or a salt of a carboxyl group is less than 0.05, the hydrophilic performance of the cellulose ester of the present invention is insufficient. For example, when the cellulose ester is used as a semipermeable membrane, the fouling resistance of the semipermeable membrane is insufficient, which is not preferable. Conversely, when the degree of substitution is more than 0.6, the alkali resistance is deteriorated, which is not preferable.

Benzoyl group (A) optionally having a substituent is a benzoyl group, or a benzoyl group having one or more substituents such as an alkyl group (such as a methyl group, a trifluoromethyl group, a tert-butyl group, or a phenyl group), an alkoxy group (such as a methoxy group or a phenoxy group), a hydroxy group, an amino group, an imino group, a halogeno group, a cyano group, and a nitro group at one or more of an ortho-position, a meta-position, and a para-position.

Among these, benzoyl group (A) optionally having a substituent is preferably selected from a benzoyl group, a p-methylbenzoyl group, an o-methylbenzoyl group, a p-methoxybenzoyl group, an o-methoxybenzoyl group, and a dimethylbenzoyl group which have both high chlorine resistance and high alkali resistance and are easily obtained.

Acyl group (B) containing a carboxyl group or a salt of a carboxyl group is preferably selected from acyl groups generated by reactions of a hydroxy group of cellulose with phthalic anhydride, succinic anhydride, maleic anhydride, and cyclohexanedicarboxylic acid anhydride.

<(4) Fourth Cellulose Ester>

A fourth cellulose ester of the present invention is represented by a structural formula of the following general formula (II),

[Formula 2]

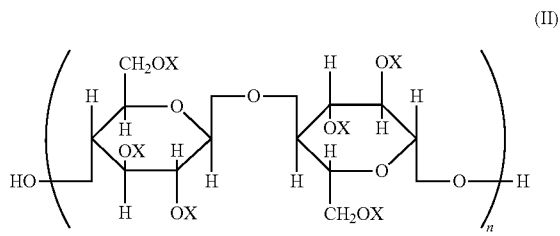

wherein some of X represents an acyl group; the remainder represents a hydrogen atom; and n represents an integer of from 20 to 20,000.

When X in the fourth cellulose ester is an acyl group, the degree of substitution is from 2.2 to 2.9. The "degree of substitution" is the average value of the numbers of acyl groups to be added with respect to three hydroxy groups in a glucose ring.

A degree of substitution equivalent to a hydroxyl group where X is a hydrogen atom is from 0.1 to 0.8.

n represents an integer of from 20 to 20,000, preferably an integer of from 40 to 10,000, and more preferably an integer of from 60 to 8,000.

When X is an acyl group, the acyl group includes benzoyl group (A) optionally having a substituent, and acyl group (B) containing a carboxyl group or a salt of a carboxyl group.

The degree of substitution of benzoyl group (A) optionally having a substituent is from 2.15 to 2.85, which is indispensable in order to improve the chlorine resistance and alkali resistance of the cellulose ester of the present invention.

The degree of substitution of acyl group (B) containing a carboxyl group or a salt of a carboxyl group is from 0.05 to 0.6, and preferably from 0.1 to 0.5.

When the degree of substitution of acyl group (B) containing a carboxyl group or a salt of a carboxyl group is less than 0.05, the hydrophilic performance of the cellulose ester of the present invention is insufficient. For example, when the cellulose ester is used as a semipermeable membrane, the fouling resistance of the semipermeable membrane is insufficient, which is not preferable. Conversely, when the degree of substitution is more than 0.6, the alkali resistance is deteriorated, which is not preferable.

Benzoyl group (A) optionally having a substituent is a benzoyl group, or a benzoyl group having one or more substituents such as an alkyl group (such as a methyl group, a trifluoromethyl group, a tert-butyl group, or a phenyl group), an alkoxy group (such as a methoxy group or a phenoxy group), a hydroxy group, an amino group, an imino group, a halogeno group, a cyano group, and a nitro group at one or more of an ortho-position, a meta-position, and a para-position.

Among these, benzoyl group (A) optionally having a substituent is preferably selected from a benzoyl group, a p-methylbenzoyl group, an o-methylbenzoyl group, a p-methoxybenzoyl group, an o-methoxybenzoyl group, and a dimethylbenzoyl group which have both high chlorine resistance and high alkali resistance and are easily obtained.

Acyl group (B) containing a carboxyl group or a salt of a carboxyl group is preferably selected from acyl groups generated by reactions of a hydroxy group of cellulose with phthalic anhydride, succinic anhydride, maleic anhydride, and cyclohexanedicarboxylic acid anhydride.

A degree of substitution equivalent to a hydroxyl group where X is a hydrogen atom is from 0.1 to 0.8.

The degree of substitution equivalent to a hydroxyl group where X is a hydrogen atom is adjusted according to the function of the cellulose ester of the present invention, and particularly by the ratio with the degree of substitution of acyl group (B) containing a carboxyl group or a salt of a carboxyl group.

<Third and Fourth Cellulose Ester Molded Articles>

The third and fourth cellulose esters of the present invention can be used for a molded article having a shape and a size depending on the intended use.

The molded article containing each of the third and fourth cellulose esters of the present invention is preferably selected from a semipermeable membrane, a sheet, an expanded sheet, a tray, a pipe, a film, a fiber (filament), a nonwoven fabric, and a container including a bag.

The semipermeable membrane can be manufactured in the same manner as in the method for manufacturing a semipermeable membrane using the first cellulose ester by using the third cellulose ester or the fourth cellulose ester, a solvent, and a membrane-forming solution which contains salts and a non-solvent as necessary.

The semipermeable membrane of the present invention is preferably a hollow fiber membrane, a separation functional membrane such as a reverse osmosis membrane or a forward osmosis membrane, or a flat membrane.

The film, the fiber (filament), the nonwoven fabric, the tray, the expanded sheet, and the container including a bag can be manufactured in the same manner as in the method for manufacturing a film, a fiber (filament), a nonwoven fabric, a tray, an expanded sheet, and a container including a bag using the first cellulose ester by using the third cellulose ester or the fourth cellulose ester, a solvent, and a membrane-forming solution which contains salts and a non-solvent as necessary.

<(5) Molded Article Containing Fifth Cellulose Ester>

A fifth cellulose ester used in the present invention is represented by a constitutional unit of the following general formula (II),

[Formula 2]

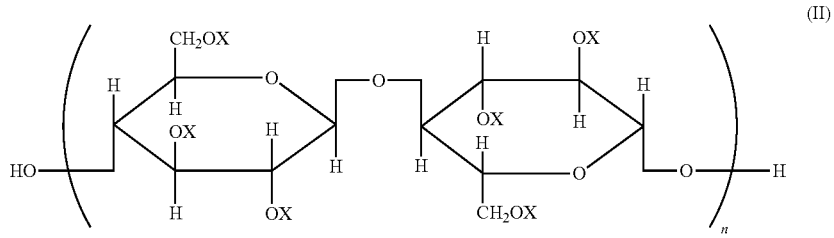

wherein some of X represents an acyl group; the remainder represents a hydrogen atom; and n represents an integer of from 20 to 20,000.

When X is an acyl group, the degree of substitution is from 1.5 to 2.9. The "degree of substitution of the acyl group" is the average value of the numbers of acyl groups to be added with respect to three hydroxy groups in a glucose ring.

80 mol % or more of the acyl group is a benzoyl group optionally having a substituent. The ratio of the benzoyl group having a substituent is preferably higher in order to improve both chlorine resistance and alkali resistance.

n represents an integer of from 20 to 20,000, preferably an integer of from 40 to 10,000, and more preferably an integer of from 60 to 8,000.

The degree of substitution of a hydroxyl group where X is a hydrogen atom is from 0.1 to 1.5, preferably from 0.2 to 1.0, and more preferably from 0.2 to 0.8.

When the degree of substitution of a hydroxyl group where X is a hydrogen atom is more than 1.5, chlorine resistance is particularly poor, which is not preferable.

The benzoyl group optionally having a substituent is a benzoyl group, or a benzoyl group having one or more substituents such as an alkyl group (such as a methyl group, a trifluoromethyl group, a tert-butyl group, or a phenyl group), an alkoxy group (such as a methoxy group or a phenoxy group), a hydroxy group, an amino group, an imino group, a halogeno group, a cyano group, and a nitro group at one or more of an ortho-position, a meta-position, and a para-position.

Among these, the benzoyl group optionally having a substituent is preferably selected from a benzoyl group, a p-methylbenzoyl group, an o-methylbenzoyl group, a p-methoxybenzoyl group, an o-methoxybenzoyl group, and a dimethylbenzoyl group which have both high chlorine resistance and high alkali resistance and are easily obtained.

When X is an acyl group, and is not the benzoyl group optionally having a substituent, X can be selected from an aliphatic acyl group having 2 or more carbon atoms and an aromatic acyl group having 5 or more carbon atoms.

The aliphatic acyl group having 2 or more carbon atoms is preferably selected from an acetyl group, a propanoyl group, a butanoyl group, a pivaloyl group, a pentanoyl group, a hexanoyl group, a decanoyl group, and an octadecanoyl group.

The aromatic acyl group having 5 or more carbon atoms is preferably selected from an acyl group having a pyrrole ring, an acyl group having a pyridine ring (a picolynyl group and a nicotinyl group), and an acyl group having a naphthalene ring.

A molded article of the present invention contains the fifth cellulose ester.

The molded article of the present invention is preferably selected from a semipermeable membrane, a sheet, an expanded sheet, a tray, a pipe, a film, a fiber (filament), a nonwoven fabric, and a container including a bag.

The semipermeable membrane can be manufactured in the same manner as in the method for manufacturing a semipermeable membrane using the first cellulose ester by using the fifth cellulose ester, a solvent, and a membrane-forming solution which contains salts and a non-solvent as necessary.

The semipermeable membrane of the present invention is preferably a hollow fiber membrane, a separation functional membrane such as a reverse osmosis membrane or a forward osmosis membrane, or a flat membrane.

The film, the fiber (filament), the nonwoven fabric, the tray, the expanded sheet, and the container including a bag can be manufactured in the same manner as in the method for manufacturing a film, a fiber (filament), a nonwoven fabric, a tray, an expanded sheet, and a container including a bag using the first cellulose ester by using the fifth cellulose ester, a solvent, and a membrane-forming solution which contains salts and a non-solvent as necessary.

EXAMPLES

Example 1<Manufacture of First Cellulose Ester>

Into a round bottom flask provided with a stirrer and a cooling pipe, 900 g of an ammonia-containing aqueous solution was introduced, and 100 g of cellulose diacetate having an acetyl substitution degree of 2.44 was then introduced thereto, followed by stirring at room temperature.

After 24 hours, the stirred product was subjected to suction filtration to collect a solid matter, thereby obtaining a cellulose-containing wet cake. The obtained wet cake was introduced into 300 g of DMSO (N,N-dimethyl sulfoxide), followed by stirring at room temperature for 1 hour, and the stirred product was subjected to suction filtration again, to collect a solid matter.

Subsequently, this cellulose was added to a solution in which 56 g of lithium chloride was dissolved in 460 g of DMAC (N,N-dimethylacetamide), followed by stirring at 100° C., to dissolve the cellulose.

The cellulose solution was introduced into a round bottom flask provided with a stirrer and a cooling pipe, and the stirring of the cellulose solution was started. A mixed solution of benzoyl chloride and p-methylbenzoyl chloride was dropped in an excessive amount as the total of two kinds of acylating agents with respect to a hydroxy group of the cellulose from a dropping funnel while the cellulose solution was continued to be stirred, followed by increasing the temperature of the resultant mixture to 80° C., and the mixture was continued to be stirred.

The obtained reaction mixture was cooled to room temperature, and methanol was added to the reaction mixture while the reaction mixture was stirred, to form a precipitate. The precipitate was collected by suction filtration to obtain a wet cake of crude cellulose benzoate p-methyl benzoate.

Ethanol was added to the obtained wet cake, followed by stirring for washing, and deliquoring. The washing operation using ethanol was further repeated three times, and the resultant product was then subjected to solvent substitution using water. The product was dried in a hot-air drier to obtain cellulose benzoate p-methyl benzoate. The degree of substitution of a benzoyl group was 2.7, and the degree of substitution of a p-methylbenzoyl group was 0.3.

The degree of substitution was confirmed by 1H-NMR and $^{13}$C-NMR.

Example 2 (Hollow Fiber Membrane Containing First Cellulose Ester of Example 1)

A hollow fiber membrane (inner diameter/outer diameter=0.8/1.3 mm) was manufactured by using the cellulose benzoate p-methyl benzoate obtained in Example 1.

Cellulose benzoate p-methyl benzoate/DMSO/LiCl=21.0/78.0/1.0 (% by mass) was used as a membrane-forming solution.

A membrane-forming method is as follows.

The membrane-forming solution was sufficiently dissolved at 105° C. The membrane-forming solution was discharged at 80° C. from the outside of a double pipe type spinning orifice, and water as an inside coagulating solution was discharged from an inner pipe. The membrane-forming solution was coagulated in a water bath at 50° C., and then a solvent was sufficiently removed in a washing bath.

The obtained hollow fiber membrane was kept in a wet state where moisture was not dried, and measured for each of items shown in Table 1.

Manufacture Example 1<Manufacture of Second Cellulose Ester>

Into a round bottom flask provided with a stirrer and a cooling pipe, 900 g of an ammonia-containing aqueous solution was introduced, and 100 g of cellulose diacetate having an acetyl substitution degree of 2.44 was then introduced thereto, followed by stirring at room temperature.

After 24 hours, the stirred product was subjected to suction filtration to collect a solid matter, thereby obtaining a cellulose-containing wet cake. The obtained wet cake was introduced into 300 g of DMSO (N,N-dimethyl sulfoxide), followed by stirring at room temperature for 1 hour, and the stirred product was subjected to suction filtration again, to collect a solid matter.

Subsequently, this cellulose was added to a solution in which 56 g of lithium chloride was dissolved in 460 g of DMAC (N,N-dimethylacetamide), followed by stirring at 100° C., to dissolve the cellulose.

The cellulose solution was introduced into a round bottom flask provided with a stirrer and a cooling pipe, and the stirring of the cellulose solution was started. A mixed solution of benzoyl chloride and propionic anhydride was dropped in an excessive amount as the total of two kinds of acylating agents with respect to a hydroxy group of the cellulose from a dropping funnel while the cellulose solution was continued to be stirred, followed by increasing the temperature of the resultant mixture to 80° C., and the mixture was continued to be stirred.

The obtained reaction mixture was cooled to room temperature, and methanol was added to the reaction mixture while the reaction mixture was stirred, to form a precipitate. The precipitate was collected by suction filtration to obtain a wet cake of crude cellulose benzoate propionate.

Ethanol was added to the obtained wet cake, followed by stirring for washing, and deliquoring. The washing operation using ethanol was further repeated three times, and the resultant product was then subjected to solvent substitution using water. The product was dried in a hot-air drier to obtain cellulose benzoate propionate. The degree of substitution of a benzoyl group was 2.3, and the degree of substitution of a propanoyl group was 0.7.

The degree of substitution was confirmed by 1H-NMR and $^{13}$C-NMR.

Example 3<Hollow Fiber Membrane Containing Second Cellulose Ester of Manufacture Example 1>

Using the cellulose benzoate propionate obtained in Manufacture Example 1, a hollow fiber membrane (inner diameter/outer diameter=0.8/1.3 mm) was manufactured in the same manner as in Example 2.

Cellulose benzoate propionate/DMSO/LiCl=21.0/78.0/1.0 (% by mass) was used as a membrane-forming solution.

The obtained hollow fiber membrane was kept in a wet state where moisture was not dried, and measured for each of items shown in Table 1.

Comparative Example 1

By using cellulose acetate in which a degree of substitution of an acetyl group was 2.87 (manufactured by Daicel Chemical Industries, Ltd.), a hollow fiber membrane (inner diameter/outer diameter=0.8/1.3 mm) was manufactured, and measured for each of items shown in Table 1.

CTA/DMSO/LiCl=17.7/81.3/1.0 (% by mass) was used as a membrane-forming solution.

A membrane-forming method is as follows.

The membrane-forming solution was sufficiently dissolved at 105° C. The membrane-forming solution was discharged at a discharge temperature of 95° C. under a pressure of 0.4 MPa from the outside of a double pipe type spinning orifice, and water as an inside coagulating solution was discharged from an inner pipe. The membrane-forming solution was passed in the air, then coagulated in a water bath, and spun at a wind-up rate of 6 m/min. Then, a solvent was sufficiently removed in a washing bath.

The obtained hollow fiber membrane was kept in a wet state where moisture was not dried, and measured for each of items shown in Table 1.

Test Example 1 (Alkali Resistance Test of Hollow Fiber Membrane)

Fifty hollow fiber membranes (inner diameter/outer diameter=0.8/1.3 mm, length=1 m) of each of Example 2, Example 3, and Comparative Example 1 were used.

10 g of NaOH pellets (purity: 97% or more) were introduced into 1 L of pure water, and dissolved. The pH value of the resultant solution was adjusted to 13.0 by using phosphoric acid.

The fifty hollow fiber membranes were completely immersed in 1 L of an alkaline aqueous solution introduced into a plastic container with a lid, and having a solution temperature of 25° C. and a pH value of 13.0 as a test solution, and an alkaline aqueous solution having a pH value of 13.0 was newly prepared every seven days, and the total amount of the test solution was exchanged.

The five hollow fiber membranes were taken out from the plastic container with a lid after 2 hours, 8 hours, 24 hours, 96 hours, and 240 hours, washed with tap water. The hollow fiber membranes were then measured for "tensile strength" and "elongation" in a wet state where moisture was wiped off from the hollow fiber membranes, and the average values of tensile strengths and elongations of the five hollow fiber membranes were obtained. The "tensile strength" and "elongation" at each of the measuring times were plotted to produce a calibration curve, thereby obtaining "tensile strength" and "elongation" between the measuring times.

Test Example 2 (Measurement of Tensile Strength and Elongation of Hollow Fiber Membrane and Method for Determining Alkali Resistance)

Using a small desktop test stand (EZ-Test manufactured by Shimadzu Corporation), the hollow fiber membranes in a wet state were pinched one by one so as to have a distance between chucks of 5 cm, and the measurements were performed at a tensile speed of 20 mm/min.

With the value of the "tensile strength" of a hollow fiber membrane which was not immersed in an alkaline aqueous solution as reference, the time required for the value to fall below 90% of the reference value was obtained from the deterioration state of the measured value of "tensile strength".

The "tensile strength" was taken as the average value of the eight samples excluding the maximum and minimum values of the "tensile strength" measured in the same ten samples. The tensile strength and elongation of the hollow fiber membrane which is not immersed in the alkaline aqueous solution are shown in Table 1.

TABLE 1

| | Degree of substitution of benzoyl group (A) | Degree of substitution of p-methylbenzoyl group (B) | Degree of substitution of propanoyl group (C) | Degree of substitution of acetyl group | Degree of substitution of hydroxy group | Tensile strength [MPa] | Elongation [%] | Alkali resistance, pH 13 [hr] |
|---|---|---|---|---|---|---|---|---|
| Example 2 | 2.7 | 0.3 | 0 | 0 | 0 | 5.8 | 7 | 240 or more |
| Example 3 | 2.3 | 0 | 0.7 | 0 | 0 | 4.4 | 5 | 192 |
| Comparative Example 1 | 0 | 0 | 0 | 2.87 | 0.13 | 5.1 | 26 | 2 |

Manufacture Examples 2 and 3

The mixing ratio of benzoyl chloride and propionic anhydride which were two kinds of acylating agents was changed in the same manner as in Manufacture Example 1, and an acylating agent-mixed solution was reacted in an excessive amount with respect to a hydroxy group of cellulose to obtain cellulose benzoate propionate.

As a result of measurement by DSC (differential scanning calorimetry) of the cellulose benzoate propionate of each of Manufacture Examples 1 to 3, the absence of a melting point was confirmed.

Manufacture Example 4

Benzoyl chloride was dropped in an excessive amount with respect to a hydroxy group of commercially available cellulose acetate propionate (degree of substitution of acetyl group: 0.07, degree of substitution of propanoyl group: 2.58) in the same manner as in Manufacture Example 1, followed by increasing the temperature of the resultant mixture to 80° C., and the mixture was continued to be stirred, to obtain a cellulose ester in which a degree of substitution of a benzoyl group was 0.35.

The degree of substitution was confirmed by $^1$H-NMR and $^{13}$C-NMR.

Manufacture Example 5

Propionic anhydride was dropped in an excessive amount with respect to a hydroxy group of the same cellulose acetate propionate as that of Manufacture Example 4 (degree of substitution of acetyl group: 0.07, degree of substitution of propanoyl group: 2.58) in the same manner as in Manufacture Example 4, followed by increasing the temperature of the resultant mixture to 80° C., and the mixture was continued to be stirred, to obtain a cellulose ester in which a degree of substitution of a propanoyl group was 2.93.

The degree of substitution was confirmed by $^1$H-NMR and $^{13}$C-NMR.

Example 4 (Manufacture of Porous Filament)

The cellulose benzoate propionate obtained in Manufacture Example 1 was used to spin a porous filament using an apparatus shown in FIG. 1.

A predetermined amount of DMSO as a solvent was charged into a round bottom flask, and a cellulose ester was added thereto such that the mixing ratio of the cellulose ester was set to 20% by mass while being stirred by a three-one motor. The resultant mixture was then warmed in an oil bath to completely dissolve the mixture.

The cellulose benzoate propionate solution (dope) was transferred to a sample bottle, naturally cooled to room temperature, and deaerated.

The solution (injection solution 3) was discharged to a jug 4 including water of 25° C. using a syringe pump 2 from an injector 1 which included a nozzle set at a tip and having a diameter of about 0.5 mm, and DMSO was replaced with water to obtain a porous filament having a diameter of 0.5 mm. The syringe pump 2 was supported by a lab jack 5.

Examples 5 and 6

The cellulose benzoate propionate obtained in each of Manufacture Examples 2 and 3 was used in the same manner as that of Example 4, to spin a porous filament, and the alkali resistance was shown in Table 2.

Reference Examples 1 to 3

The cellulose ester obtained in each of Manufacture Examples 4 and 5 and cellulose benzoate in which a degree of substitution of a benzoyl group was 3.0 were used in the same manner as that of Example 4 to spin a porous filament, and the alkali resistance was shown in Table 2.

Comparative Example 2

The cellulose acetate (manufactured by Daicel Chemical Industries, Ltd.) having a degree of substitution of an acetyl group of 2.87 and being the same as that of Comparative Example 1 was used in the same manner as that of Example 4, to spin a porous filament, and the alkali resistance was shown in Table 2.

Test Example 3 (Measurement of Tensile Strength of Porous Filament and Method for Determining Alkali Resistance)

An alkali resistance test was carried out in the same manner as in Test Example 1. Then, using a small desktop test stand (EZ-Test manufactured by Shimadzu Corporation), the hollow fiber membranes in a wet state were pinched one by one so as to have a distance between chucks of 5 cm, and the measurements were performed at a tensile speed of 20 mm/min.

With the value of the "tensile strength" of a hollow fiber membrane which was not immersed in an alkaline aqueous solution having a solution temperature of 25° C. and a pH value of 12.0 or 13.0 as reference, the time required for the value to fall below 90% of the reference value was obtained from the deterioration state of the measured value of "tensile strength" and shown in Table 2.

The "tensile strength" was taken as the average value of the three samples excluding the maximum and minimum values of the "tensile strength" measured in the same five samples.

TABLE 2

|  |  | Degree of substitution of Bz | pH 12 (hr) | pH 13 (hr) |
|---|---|---|---|---|
| Manufacture Example 1 (Example 4) | CBzP (Bz2.3/P0.7) | 2.30 | 211 | 42 |
| Manufacture Example 2 (Example 5) | CBzP (Bz1.8/P1.2) | 1.80 | 175 | 48 |
| Manufacture Example 3 (Example 6) | CBzP (Bz1.3/P1.7) | 1.30 | 102 | 35 |
| Manufacture Example 4 (Reference Example 1) | CAPBz (Bz0.35/P2.58) | 0.35 | 27 | 27 |
| Manufacture Example 5 (Reference Example 2) | CAP | 0.00 | 9 | 9 |
| Reference Example 3 | CBz | 3.00 | 250 or more | 45 |
| Comparative Example 2 | CA having degree of substitution of 2.87 | 0.00 | 2 | 2 |

Bz represents benzoyl group; P represents propyl group; and CA represents cellulose acetate.

Example 7 <Manufacture of Fourth Cellulose Ester>

Into a round bottom flask provided with a stirrer and a cooling pipe, 900 g of an ammonia-containing aqueous solution was introduced, and 100 g of cellulose diacetate having an acetyl substitution degree of 2.44 was then introduced thereto, followed by stirring at room temperature.

After 24 hours, the stirred product was subjected to suction filtration to collect a solid matter, thereby obtaining a cellulose-containing wet cake. The obtained wet cake was introduced into 300 g of DMSO (N,N-dimethyl sulfoxide), followed by stirring at room temperature for 1 hour, and the stirred product was subjected to suction filtration again, to collect a solid matter.

Subsequently, this cellulose was added to a solution in which 56 g of lithium chloride was dissolved in 460 g of DMAC (N,N-dimethylacetamide), followed by stirring at 100° C., to dissolve the cellulose.

The cellulose solution was introduced into a round bottom flask provided with a stirrer and a cooling pipe, and the stirring of the cellulose solution was started. Benzoyl chloride equivalent to 90 mol % with respect to a hydroxy group of the cellulose was dropped from a dropping funnel while the cellulose solution was continued to be stirred, followed by increasing the temperature of the resultant mixture to 80° C., and the mixture was continued to be stirred.

Then, a DMAC solution of phthalic anhydride equivalent to 5 mol % with respect to a hydroxy group of the cellulose was dropped from a dropping funnel, and the mixture was then continued to be stirred.

The obtained reaction mixture was cooled to room temperature, and methanol was added to the reaction mixture while the reaction mixture was stirred, to form a precipitate. The precipitate was collected by suction filtration to obtain a wet cake of crude cellulose benzoate phthalate.

Ethanol was added to the obtained wet cake, followed by stirring for washing, and deliquoring. The washing operation using ethanol was further repeated three times, and the resultant product was then subjected to solvent substitution using water. The product was dried in a hot-air drier to obtain cellulose benzoate phthalate. The degree of substitution of a benzoyl group was 2.7, and the degree of substitution of an o-carboxylic acid benzoyl group was 0.15.

The degree of substitution was confirmed by $^1$H-NMR and $^{13}$C-NMR.

Example 8 (Hollow Fiber Membrane Containing Cellulose Ester of Example 7)

By using the cellulose benzoate phthalate obtained in Example 7, a hollow fiber membrane (inner diameter/outer diameter=0.8/1.3 mm) was manufactured.

Cellulose benzoate phthalate/DMSO/LiCl=21.0/78.0/1.0 (% by mass) was used as a membrane-forming solution.

A membrane-forming method is as follows.

The membrane-forming solution was sufficiently dissolved at 105° C. The membrane-forming solution was discharged at 80° C. from the outside of a double pipe type spinning orifice, and water as an inside coagulating solution was discharged from an inner pipe. The membrane-forming solution was coagulated in a water bath at 50° C., and then a solvent was sufficiently removed in a washing bath.

The obtained hollow fiber membrane was kept in a wet state where moisture was not dried, and measured for each of items shown in Table 3.

Comparative Example 3

By using cellulose acetate in which a degree of substitution of an acetyl group was 2.87 (manufactured by Daicel Chemical Industries, Ltd.), a hollow fiber membrane (inner diameter/outer diameter=0.8/1.3 mm) was manufactured, and measured for each of items shown in Table 4.

CTA/DMSO/LiCl=17.7/81.3/1.0 (% by mass) was used as a membrane-forming solution.

A membrane-forming method is as follows.

The membrane-forming solution was sufficiently dissolved at 105° C. The membrane-forming solution was discharged at a discharge temperature of 95° C. under a pressure of 0.4 MPa from the outside of a double pipe type spinning orifice, and water as an inside coagulating solution was discharged from an inner pipe. The membrane-forming solution was passed in the air, then coagulated in a water bath, and spun at a wind-up rate of 6 m/min. Then, a solvent was sufficiently removed in a washing bath.

The obtained hollow fiber membrane was kept in a wet state where moisture was not dried, and measured for each of items shown in Table 3.

Test Example 4 (Alkali Resistance Test of Hollow Fiber Membrane)

Fifty hollow fiber membranes (inner diameter/outer diameter=0.8/1.3 mm, length=1 m) of each of Example 8 and Comparative Example 3 were used, and tested in the same manner as in Test Example 1 to measure "tensile strength"

and "elongation". The average value of the five hollow fiber membranes for each of "tensile strength" and "elongation" was obtained.

Test Example 5 (Measurement of Tension Strength of Hollow Fiber Membrane and Method for Determining Alkali Resistance)

A test was carried out in the same manner as in Test Example 2. The tensile strength and elongation of a hollow fiber membrane which is not immersed in an alkaline aqueous solution are shown in Table 3.

TABLE 3

| | Degree of substitution of benzoyl group (A) | Degree of substitution of o-carboxylic acid benzoyl group (B) | Degree of substitution of acetyl group | Degree of substitution of hydroxy group | Tensile strength [MPa] | Elongation [%] | Alkali resistance, pH 13 [hr] |
|---|---|---|---|---|---|---|---|
| Example 8 | 2.7 | 0.15 | 0 | 0.15 | 5.5 | 6 | 240 or more |
| Comparative Example 3 | 0 | 0 | 2.87 | 0.13 | 5.1 | 26 | 2 |

Example 9 (Manufacture of Porous Filament)

The cellulose benzoate phthalate obtained in Example 7 was used to spin a porous filament using an apparatus shown in FIG. 1.

A predetermined amount of DMSO as a solvent was charged into a round bottom flask, and a cellulose ester was added thereto such that the mixing ratio of the cellulose ester was set to 20% by mass while being stirred by a three-one motor. The resultant mixture was then warmed in an oil bath to completely dissolve the mixture.

The cellulose benzoate phthalate solution (dope) was transferred to a sample bottle, naturally cooled to room temperature, and deaerated.

The solution (injection solution 3) was discharged to a jug 4 including water of 25° C. using a syringe pump 2 from an injector 1 which included a nozzle set at a tip and having a diameter of about 0.5 mm, and DMSO was replaced with water to obtain a porous filament having a diameter of 0.5 mm. The syringe pump 2 was supported by a lab jack 5.

Test Example 6 (Measurement of Tensile Strength and Elongation of Porous Filament and Method for Determining Alkali Resistance)

Measurement was carried out in the same manner as in Test Example 3.

Comparative Example 4

The cellulose acetate (manufactured by Daicel Chemical Industries, Ltd.) having a degree of substitution of an acetyl group was 2.87 and being the same as that of Comparative Example 3 was used to spin porous filament and evaluate the alkali resistance in the same method as that of Example 9. The results were shown in Table 4.

TABLE 4

| | | pH 12 (hr) |
|---|---|---|
| Example 9 | Cellulose benzoate phthalate | 240 or more |
| Comparative Example 4 | Cellulose triacetate | 2 |

Manufacture Example 6 (Manufacture of Fifth Cellulose Ester According to Saponification and Benzoylation of Cellulose Diacetate)

Into a round bottom flask provided with a stirrer and a cooling pipe, 900 g of an ammonia-containing aqueous solution was introduced, and 100 g of cellulose diacetate having an acetyl substitution degree of 2.44 was then introduced thereto, followed by stirring at room temperature.

After 24 hours, the stirred product was subjected to suction filtration to collect a solid matter, thereby obtaining a cellulose-containing wet cake. The obtained wet cake was introduced into 300 g of DMSO (N,N-dimethyl sulfoxide), followed by stirring at room temperature for 1 hour, and the stirred product was subjected to suction filtration again, to collect a solid matter.

Subsequently, this cellulose was added to a solution in which 56 g of lithium chloride was dissolved in 460 g of DMAC (N,N-dimethylacetamide), followed by stirring at 100° C., to dissolve the cellulose.

The cellulose solution was introduced into a round bottom flask provided with a stirrer and a cooling pipe, and the stirring of the cellulose solution was started. Benzoyl chloride equivalent to 90 mol % with respect to a hydroxy group of the cellulose was dropped from a dropping funnel while the cellulose solution was continued to be stirred, followed by increasing the temperature of the resultant mixture to 80° C., and the mixture was continued to be stirred.

The obtained reaction mixture was cooled to room temperature, and methanol was added to the reaction mixture while the reaction mixture was stirred, to form a precipitate. The precipitate was collected by suction filtration to obtain a wet cake of crude cellulose benzoate.

Ethanol was added to the obtained wet cake, followed by stirring for washing, and deliquoring. The washing operation using ethanol was further repeated three times, and the resultant product was then subjected to solvent substitution using water. The product was dried in a hot-air drier to obtain cellulose benzoate. The degree of substitution of a benzoyl group was 2.7.

The degree of substitution was confirmed by 1H-NMR and $^{13}$C-NMR. As a result of measurement by DSC (differential scanning calorimetry), a broad melting peak was confirmed to be present in a range of about 220° C. to about 255° C.

Manufacture Example 7

Cellulose benzoate was obtained in the same manner as in Manufacture Example 6 except that benzoyl chloride equivalent to 80 mol % with respect to a hydroxy group of cellulose was used. The degree of substitution of a benzoyl group was 2.4.

As a result of measurement by DSC (differential scanning calorimetry), a broad melting peak was confirmed to be present in a range of about 170° C. to about 255° C.

Manufacture Example 8

Cellulose benzoate was obtained in the same manner as in Manufacture Example 6 except that benzoyl chloride equivalent to 73 mol % with respect to a hydroxy group of cellulose was used. The degree of substitution of a benzoyl group was 2.2.

Examples 10 to 12 (Manufacture of Porous Filament)

The cellulose benzoate obtained in each of Manufacture Examples 6 to 8 was used to spin a porous filament using an apparatus shown in FIG. 1.

A predetermined amount of DMSO as a solvent was charged into a round bottom flask, and a cellulose ester was added thereto such that the mixing ratio of the cellulose ester was set to 20% by mass while being stirred by a three-one motor. The resultant mixture was then warmed in an oil bath to completely dissolve the mixture.

The cellulose benzoate solution (dope) was transferred to a sample bottle, naturally cooled to room temperature, and deaerated.

The solution (injection solution 3) was discharged to a jug 4 including water of 25° C. using a syringe pump 2 from an injector 1 which included a nozzle set at a tip and having a diameter of about 0.5 mm, and DMSO was replaced with water to obtain a porous filament having a diameter of 0.5 mm. The syringe pump 2 was supported by a lab jack 5.

The obtained porous filament was kept in a wet state where moisture was not dried, and each measurement shown in the following Table 5 was performed. The results are shown in Table 5.

Reference Example 4

Cellulose benzoate in which a degree of substitution of a benzoyl group was 3.0 was used in the same manner as that of each of Examples 10 to 12, to spin a porous filament, and each measurement shown in the following Table 5 was performed. The results are shown in Table 5.

Example 13 (Manufacture of Hollow Fiber Membrane)

A hollow fiber membrane (inner diameter/outer diameter=0.8/1.3 mm) was manufactured by using the cellulose benzoate obtained in Manufacture Example 6.

Cellulose benzoate/DMSO/LiCl=21.0/78.0/1.0 (% by mass) was used as a membrane-forming solution.

A membrane-forming method is as follows.

The membrane-forming solution was sufficiently dissolved at 105° C. The membrane-forming solution was discharged at 80° C. from the outside of a double pipe type spinning orifice, and water as an inside coagulating solution was discharged from an inner pipe. The membrane-forming solution was coagulated in a water bath at 50° C., and then a solvent was sufficiently removed in a washing bath.

The obtained hollow fiber membrane was kept in a wet state where moisture was not dried, and measured for each of items shown in Table 6.

Comparative Example 5

A hollow fiber membrane (inner diameter/outer diameter=0.8/1.3 mm) was manufactured by using cellulose acetate in which a degree of substitution was 2.87 (manufactured by Daicel Chemical Industries, Ltd.), and measured for each of items shown in Table 6.

CTA/DMSO/LiCl=17.7/81.3/1.0 (% by mass) was used as a membrane-forming solution.

A membrane-forming method is as follows.

The membrane-forming solution was sufficiently dissolved at 105° C. The membrane-forming solution was discharged at a discharge temperature of 95° C. under a pressure of 0.4 MPa from the outside of a double pipe type spinning orifice, and water as an inside coagulating solution was discharged from an inner pipe. The membrane-forming solution was passed in the air, then coagulated in a water bath, and spun at a wind-up rate of 6 m/min. Then, a solvent was sufficiently removed in a washing bath.

The obtained hollow fiber membrane was kept in a wet state where moisture was not dried, and measured for each of items shown in Table 6.

Test Example 7 (Chlorine Resistance Test)

The fifty porous filaments (diameter=0.5 mm, length=10 cm) of each of Examples 10 to 12 and Reference Example 4 or the fifty hollow fiber membranes (inner diameter/outer diameter=0.8/1.3 mm, length=1 m) of each of Example 13 and Comparative Example 5 were used.

A sodium hypochlorite aqueous solution having an available chlorine concentration of 12% by mass was diluted with pure water, and the diluted sodium hypochlorite aqueous solution was used for a test solution of a 500 ppm or 1000 ppm sodium hypochlorite aqueous solution. The available chlorine concentration was measured by using a handy water quality meter AQUAB (type AQ-102) manufactured by Sibata Scientific Technology Ltd.

The fifty hollow fiber membranes were completely immersed in 1 L of a 500 ppm sodium hypochlorite aqueous solution introduced into a plastic container with a lid and having a solution temperature of about 25° C. as a test solution. A 500 ppm or 1000 ppm sodium hypochlorite aqueous solution was newly prepared every seven days, and the total amount of the test solution was exchanged.

The ten hollow fibers were taken out from the plastic container with a lid every seven days, and washed with tap water. Then, the hollow fibers were measured for "tensile strength" and "elongation" in a wet state where moisture was wiped off from the hollow fibers. The results are shown in Table 5 and Table 6.

The "tensile strength" and "elongation" at each of the measuring days were plotted to produce a calibration curve, thereby obtaining "tensile strength" and "elongation" between the measuring days (every seven measuring days).

Test Example 8 (Alkali Resistance Test)

The fifty porous filaments (diameter=0.5 mm, length=10 cm) of each of Examples 10 to 12 and Reference Example 4, or the fifty hollow fiber membranes of each of Example 13 and Comparative Example 5 were used.

10 g of NaOH pellets (purity: 97% or more) were introduced into 1 L of pure water, and dissolved. The pH value of the solution was adjusted to 12.0 by using phosphoric acid.

The fifty porous filaments or the fifty hollow fiber membranes were completely immersed in 1 L of an alkaline aqueous solution introduced into a plastic container with a lid, and having a solution temperature of 25° C. and a pH value of 12.0 as a test solution, and an alkaline aqueous solution having a pH value of 12.0 was newly prepared every seven days, and the total amount of the test solution was exchanged.

The five porous filaments or the five hollow fiber membranes were taken out from the plastic container with a lid after 2 hours, 8 hours, 24 hours, 96 hours, and 240 hours, and washed with tap water. The porous filaments or the hollow fiber membranes were then measured for "tensile strength" and "elongation" in a wet state where moisture was wiped off from the porous filaments or the hollow fiber membranes. The "tensile strength" and "elongation" at each of the measuring times were plotted to produce a calibration curve, thereby obtaining "tensile strength" and "elongation" between the measuring times.

Test Example 9 (Measurement of Tensile Strength and Method for Determining Chlorine Resistance and Alkali Resistance)

Using a small desktop test stand (EZ-Test manufactured by Shimadzu Corporation), the hollow fiber membranes in a wet state were pinched one by one so as to have a distance between chucks of 5 cm, and the measurements were performed at a tensile speed of 20 mm/min.

With the value of the "tensile strength" of a hollow fiber membrane which was not immersed in a 500 ppm or 1000 ppm sodium hypochlorite aqueous solution or in an alkaline aqueous solution having a solution temperature of 25° C. and a pH value of 12.0 as reference, the time (day or time) required for the value to fall below 90% of the reference value was obtained from the deterioration state of the measured value of "tensile strength."

The "tensile strength" was taken as the average value of the three samples excluding the maximum and minimum values of the "tensile strength" measured in the same five samples. The results are shown in Table 5 and Table 6. The tensile strength and elongation of Table 6 show the tensile strength and elongation of the hollow fiber membrane which was not immersed in the sodium hypochlorite aqueous solution or the alkaline aqueous solution.

TABLE 5

|  |  | Degree of substitution of Bz | Alkali resistance, pH 12 [hr] | Chlorine resistance, 500 ppm [day] | Chlorine resistance, 1000 ppm [day] |
| --- | --- | --- | --- | --- | --- |
| Example 10 (Manufacture Example 6) | CBzOH (BZ2.7/ OH0.3) | 2.7 | 264 or more | 49 or more | 28 or more |
| Example 11 (Manufacture Example 7) | CBzOH (BZ2.4/ OH0.6) | 2.4 | 264 or more | 49 or more | 28 or more |
| Example 12 (Manufacture Example 8) | CBzOH (BZ2.2/ OH0.8) | 2.2 | 264 or more | 49 or more | 28 or more |
| Reference Example 4 | CBz | 3.0 | 250 or more | 50 or more | 25 or more |

Bz represents benzoyl group, and OH represents unsubstituted hydroxy group.

TABLE 6

|  | Degree of substitution of benzoyl group | Degree of substitution of acetyl group | Degree of substitution of hydroxy group | Tensile strength [MPa] | Elongation [%] | Alkali resistance, pH 12 [hr] | Chlorine resistance, 500 ppm [day] | Chlorine resistance, 1000 ppm [day] |
| --- | --- | --- | --- | --- | --- | --- | --- | --- |
| Example 13 | 2.7 | 0 | 0.3 | 6.1 | 8 | 264 or more | 49 or more | 28 or more |
| Comparative Example 5 | 0 | 2.87 | 0.13 | 5.1 | 26 | 2 | 6 | 3 |

The cellulose benzoates of Examples 10 to 13 exhibited chlorine resistance and alkali resistance equivalent to those of cellulose benzoate in which a degree of substitution of a benzoyl group was 3.0.

INDUSTRIAL APPLICABILITY

The molded article containing each of the first to fifth cellulose esters of the present invention can be utilized as a semipermeable membrane, a sheet, an expanded sheet, a tray, a pipe, a film, a fiber (filament), a nonwoven fabric, and a container including a bag.

The invention claimed is:

1. A cellulose ester represented by a structural formula of the following general formula (II), wherein:
   a degree of substitution where X is an acyl group is from 2.2 to 2.9;
   the acyl group comprises a benzoyl group (A) optionally having a substituent, and an acyl group (B) containing a carboxyl group or a salt of a carboxyl group;
   a degree of substitution of the benzoyl group (A) optionally having a substituent is from 2.15 to 2.85, and a degree of substitution of the acyl group (B) containing a carboxyl group or a salt of a carboxyl group is from 0.05 to 0.6; and a degree of substitution equivalent to a hydroxyl group where X is a hydrogen atom is from 0.1 to 0.8,

[Formula 1]

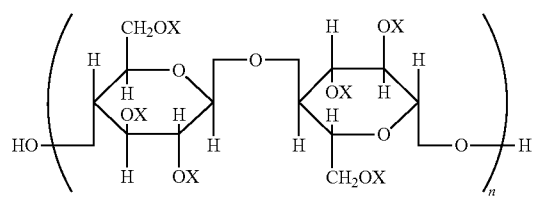

(I)

wherein some of X represents an acyl group; the remainder represents a hydrogen atom; and n represents an integer of from 20 to 20,000.

2. The cellulose ester according to claim 1, wherein:
the benzoyl group (A) optionally having a substituent is selected from a benzoyl group, a p-methylbenzoyl group, an o-methylbenzoyl group, a p-methoxybenzoyl group, an o-methoxybenzoyl group, and a dimethylbenzoyl group; and
the acyl group (B) containing a carboxyl group or a salt of a carboxyl group is selected from an o-carboxylic acid (salt) benzoyl group and 3-carboxylic acid (salt) propanoyl group.

3. A molded article comprising the cellulose ester according to claim 1.

4. A semipermeable membrane comprising a cellulose ester represented by a structural formula of the following general formula (II), wherein:
a degree of substitution where X is an acyl group is from 1.5 to 2.9;
80 mol % or more of the acyl group is a benzoyl group optionally having a substituent; and
a degree of substitution of a hydroxyl group where X is a hydrogen atom is from 0.1 to 1.5;

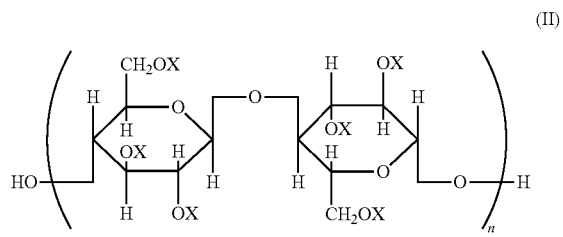

(II)

wherein some of X represents an acyl group; the remainder represents a hydrogen atom; and n represents an integer of from 20 to 20,000;
wherein the benzoyl group optionally having a substituent is selected from a benzoyl group, an o-methylbenzoyl group, an o-methoxybenzoyl group, and a dimethylbenzoyl group.

* * * * *